(12) United States Patent
Hamaguchi

(10) Patent No.: US 10,414,585 B2
(45) Date of Patent: Sep. 17, 2019

(54) PLANAR STORAGE FACILITY

(71) Applicant: Daifuku Co., Ltd., Osaka (JP)

(72) Inventor: Jun Hamaguchi, Shiga (JP)

(73) Assignee: Daifuku Co., Ltd. (JP)

( * ) Notice: Subject to any disclaimer, the term of this patent is extended or adjusted under 35 U.S.C. 154(b) by 0 days.

(21) Appl. No.: 15/688,263

(22) Filed: Aug. 28, 2017

(65) Prior Publication Data

US 2017/0355525 A1 Dec. 14, 2017

Related U.S. Application Data

(63) Continuation of application No. PCT/JP2016/050698, filed on Jan. 12, 2016.

(30) Foreign Application Priority Data

Apr. 30, 2015 (JP) .................................. 2015-092814

(51) Int. Cl.
| | | |
|---|---|---|
| *B65G 1/04* | (2006.01) | |
| *B65G 1/137* | (2006.01) | |
| *B65G 61/00* | (2006.01) | |
| *B66C 13/48* | (2006.01) | |

(52) U.S. Cl.
CPC ........... *B65G 1/0464* (2013.01); *B65G 1/137* (2013.01); *B65G 61/00* (2013.01); *B66C 13/48* (2013.01)

(58) Field of Classification Search
CPC ...... B65G 1/0464; B65G 61/00; B65G 1/137; B66C 13/48
See application file for complete search history.

(56) References Cited

U.S. PATENT DOCUMENTS

| | | | | |
|---|---|---|---|---|
| 2,165,513 A | * | 7/1939 | Smith | F25D 13/02 312/312 |
| 2017/0233187 A1 | * | 8/2017 | Fukushima | B65G 1/0464 414/279 |
| 2017/0305668 A1 | * | 10/2017 | Bestic | B65D 25/22 |

FOREIGN PATENT DOCUMENTS

| | | |
|---|---|---|
| JP | H01122806 A | 5/1989 |
| JP | H07172762 A | 7/1995 |
| JP | 2000238906 A | 9/2000 |
| JP | 2014177337 A | 9/2014 |

* cited by examiner

*Primary Examiner* — Saul Rodriguez
*Assistant Examiner* — Ashley K Romano
(74) *Attorney, Agent, or Firm* — St. Onge Steward Johnston & Reens LLC

(57) ABSTRACT

A planar storage facility is provided with a storage/retrieval device for suspending and transporting storage items between a desired position in a storage item placement plane and a storage conveyor and a retrieval conveyor. A plurality of passage regions dividing the storage item placement plane into small areas are established in the storage item placement plane. At least one end of the passage regions opens to the outside of the periphery of the storage item placement plane. The task of manually unloading the storage items in the small areas can be performed from within the passage regions forming the small areas.

4 Claims, 5 Drawing Sheets

350 × 350

300 × 420

500 × 550

550 × 650

PLANAR STORAGE FACILITY

FIELD OF THE INVENTION

The present invention relates to a planar storage facility that includes a storage item placement plane, a storage/retrieval conveyor, and a storage/retrieval device for lifting and transporting a storage item between the storage/retrieval conveyor and a desired position on the storage item placement plane.

BACKGROUND OF THE INVENTION

In this type of planar storage facility, as described in Japanese Published Unexamined Patent Application No. H7-172762 (Patent Literature 1), the storage/retrieval device is configured so as to correspond to the shape of the storage item and the like, and thus as long as the storage/retrieval device can handle the item, storage items to be stored having various types of planar sizes such as a plastic container of a planar size which can be manually transported can be stored and retrieved in and from a desired position within the storage item placement plane. Then, since this type of planar storage facility is configured such that a storage/retrieval operation is performed by an automatic operation of the storage/retrieval device, the storage/retrieval device is automatically operated such that storage items are stored close together while giving first priority to the storage efficiency as long as a problem in the storage/retrieval by the storage/retrieval device is prevented from being encountered.

SUMMARY OF THE INVENTION

However, although a situation can naturally be anticipated where the storage/retrieval device cannot be used due to a failure or maintenance and inspection because the storage/retrieval device is a mechanical facility, it is necessary to wait for a retrieval operation until the storage/retrieval device is returned to a state where the storage/retrieval device is automatically operated normally, and thus significant adverse effects are produced on an operation side that needs the storage item to be retrieved. In particular, in a case where the storage item to be handled is a plastic container of a planar size which can be manually transported as described above, it can be considered that the storage item which needs to be urgently retrieved is manually retrieved. However, in this type of planar storage facility, in general, the storage item placement plane is very wide in area, and even if a passage is provided so as to cross this wide storage item placement plane, in a case where the storage item to be urgently retrieved is present in a place several meters away from the outside of the periphery of the storage item placement plane or from the passage, an operator needs to manually remove a large number of storage items in front of the storage item to be urgently retrieved so as to form a passage region for approaching the storage item to be urgently retrieved, with the result that enormous effort and time are required for the operation.

The present invention proposes a planar storage facility which can solve the conventional problem as described above, and for ease of understanding of a relationship with an embodiment which will be described later, the planar storage facility according to the present invention will be shown with reference signs which are used in the description of the embodiment and which are placed in parentheses. The planar storage facility includes a storage item placement plane (1), a storage conveyor (12), a retrieval conveyor (13), and a storage/retrieval device (2) which lifts and transports a storage item (C) between a desired position on the storage item placement plane (1) and the storage conveyor (12) and the retrieval conveyor (13), where, a plurality of passage regions (PAa1 to PAb3) dividing the storage item placement plane (1) into small areas (SAa1 to SAb4) are established in the storage item placement plane (1), and at least one end of the passage regions (PAa1 to PAb3) opens to an outside of the periphery of the storage item placement plane (1) such that an operation of manually transporting out the storage item (C) in the small areas (SAa1 to SAb4) can be performed from within the passage regions (PAa1 to PAb3) forming the small areas (SAa1 to SAb4).

According to the configuration of the present invention described above, even if the storage item placement plane is very wide in area, in a case where the storage item placed and stored on the storage item placement plane needs to be urgently retrieved manually, the operator can utilize the passage region which opens to the outside of the periphery of the storage item placement plane, easily and swiftly enter the vicinity of the storage item to be urgently retrieved, manually take up the storage item to be urgently retrieved and bring the item to the outside of the periphery of the storage item placement plane. That is, it is possible to extremely efficiently, and safely and easily perform the operation of manually retrieving the storage item which needs to be urgently retrieved.

It is a matter of course that, preferably, in a case where the above-described operation of urgently retrieving the storage item is performed manually, regardless of where the storage item to be urgently retrieved is present in the small area within the passage region, the width and the planar shape of the small area within the passage region are set such that the storage item to be urgently retrieved is directly taken out from within the passage region or the outside of the periphery of the storage item placement plane. However, depending on the case, even when the area is a small area in which obstructive storage items between the storage item to be urgently retrieved and the passage region or the periphery of the storage item placement plane need to be removed, as compared with a case where the passage region is not present, it is possible to significantly reduce effort and time required for the manual operation of taking out the storage item to be urgently retrieved.

When the passage region is established so as to meet the object of the present invention, even if the storage item placement plane is large, the storage efficiency thereof is significantly lowered. Therefore, preferably, in a full state where the storage items are stored in all of the respective small areas, the storage/retrieval device is controlled such that the storage item is stored into the passage region from an innermost section of the passage region farthest from an open end which opens to the outside of the periphery of the storage item placement plane. According to this configuration, even in a case where a large storage item placement space is needed because opportunities for retrieval are few, the passage regions are temporarily utilized for the storage of the storage items, and thus it is possible to effectively utilize the storage facility.

Furthermore, the storage item placement plane can be configured such that the storage item placement plane is divided into a plurality of storage regions according to the planar sizes of the storage items, the small areas are established within each of the storage regions by the utilization of the passage regions, and the storage item to be stored is stored into the small area selected within the storage region compatible with the planar size of the storage item. According to this configuration, in a case where the storage items having various different planar sizes are stored, one compatible storage region is selected from a plurality of storage regions so as to meet the planar size of the storage item to be stored, the storage item is only stored into the selected storage region and thus it is possible to enhance the storage efficiency of the entire storage item placement plane.

DETAILED DESCRIPTION OF THE INVENTION

Figure 1:
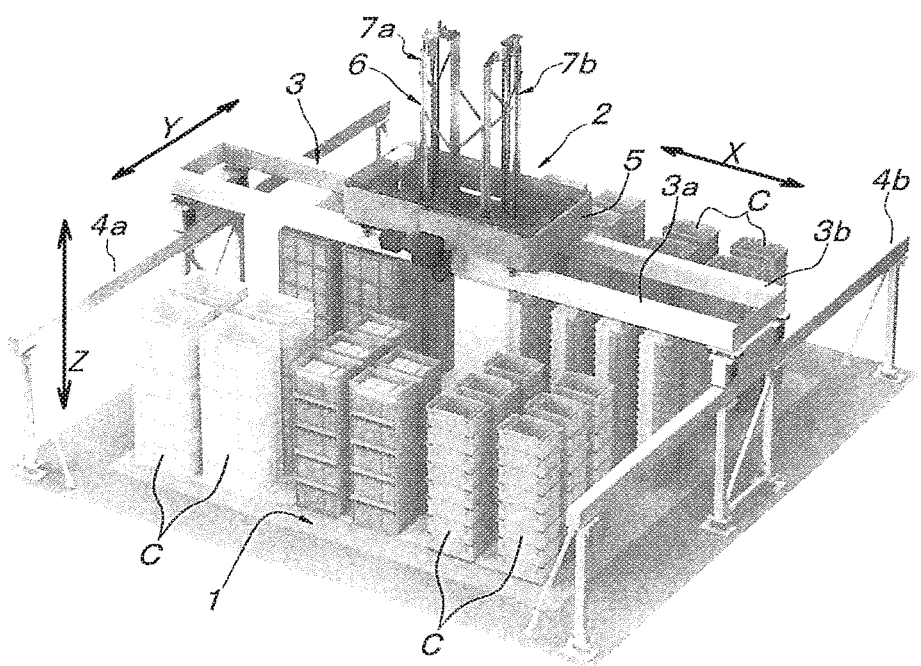
FIG. 1 is a perspective view showing an example of the configuration of an entire storage facility.

In FIG. 1, reference sign 1 denotes a rectangular storage item placement plane, and reference sign 2 denotes a storage/retrieval device. Reference sign 3 denotes a Y-direction laterally moving member, and the y-direction laterally moving member 3 includes two guide rails 3a and 3b parallel to an X direction (left/right direction). Reference sign 4a and 4b denote a pair of fixed guide rails which are placed parallel to the Y direction on both outsides of the storage item placement plane 1 in the X direction, and the pair of fixed guide rails 4a and 4b support both end portions of the Y-direction laterally moving member 3 in the X direction such that the Y-direction laterally moving member 3 is freely moved parallel to the Y direction (forward/backward direction) above a certain height of the storage item placement plane 1. The storage/retrieval device 2 is configured with a carriage 5 which is supported by the two guide rails 3a and 3b of the Y-direction laterally moving member 3 so as to be freely moved in the X direction and a storage item gripping means 6 which is supported by the carriage 5 so as to be freely raised and lowered.

Although as the storage item gripping means 6, various types thereof which are configured so as to be compatible with the storage items to be handled can be considered, the storage item gripping means 6 in this embodiment includes an X-direction pair of gripping units 7A and 7B such that the gripping units 7A and 7B are freely moved close to and away from each other in the X direction. Both the gripping units 7A and 7B are supported to the carriage 5 so as to be raised and lowered between the two guide rails 3a and 3b of the Y-direction laterally moving member 3 and to be freely raised and lowered in synchronization with each other, and include Y-direction pairs of gripping columnar members 8a to 9b and lifting tools 10 and 11 located in a center position between the gripping columnar members 8a and 8b and in a center position between the gripping columnar members 9a and 9b. A storage item C that is handled in this embodiment is a rectangular plastic transport container which has, in a planar shape, a width W in the Y direction and a length L in the X direction, and includes, on its outside surface, a reinforcement overhanging rib Cx which is continuous over the entire periphery.

The respective gripping columnar members 8a to 9b are columnar members which can be fitted from the outside to the four corners of the storage item C and whose horizontal cross section is formed in the shape of the letter L, and in the lifting tools 10 and 11, engagement tools 10a and 11a which are freely engaged and disengaged with the reinforcement overhanging rib Cx in the center portions of both sides of the storage item C parallel to the Y direction are provided on at least the inner sides of the lower end portions of raising/lowering columnar members 10b and 11b. The engagement tools 10a and 11a include a large number of pins which protrude from vertical rectangular surfaces parallel to the Y direction and which are parallel to the X direction, and the respective pins are held in a protruding posture where the pins are protruded inward by springs.

Figure 2A:
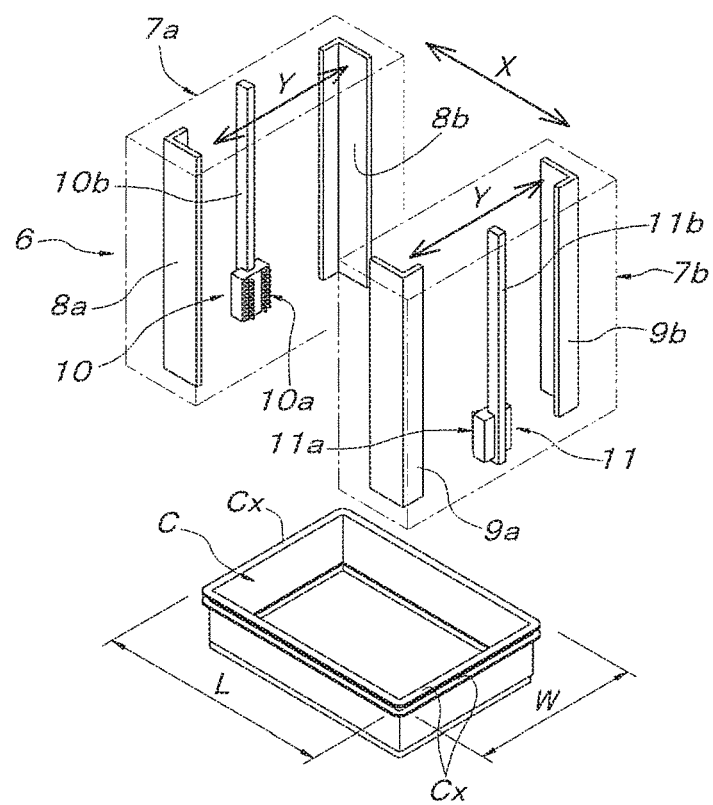
FIG. 2A is a perspective view showing the storage item gripping means of a storage/retrieval device and a storage item in the storage facility.
Figure 2B:
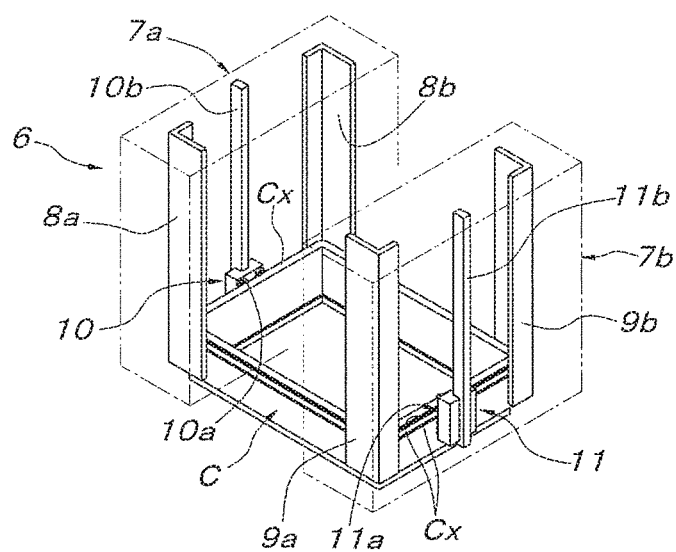
FIG. 2B is a perspective view showing a state where the storage item gripping means grips the storage item.
Figure 3A:
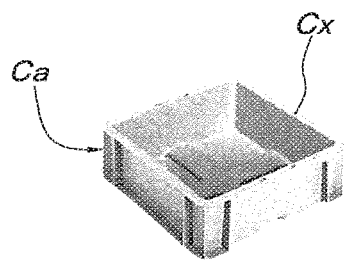
FIGS. 3A to 3D are perspective views showing four types of storage items having different planar sizes.
Figure 3B:
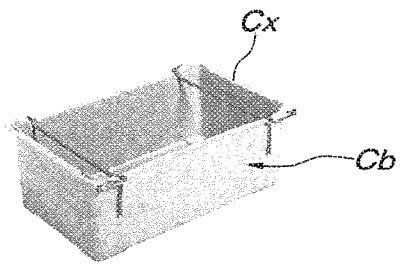
Figure 3C:
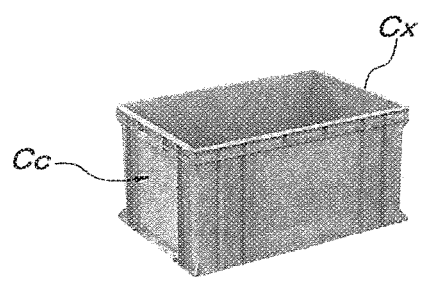
Figure 3D:
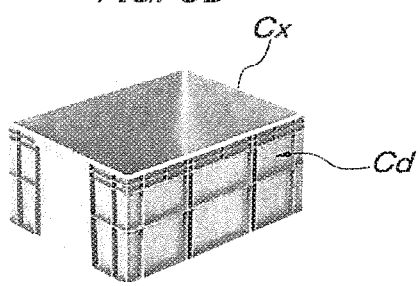
Figure 3E:
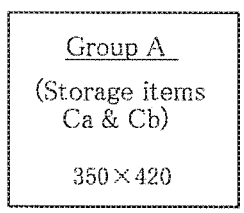
FIGS. 3E and 3F are diagrams illustrating, when the four types of storage items are divided into two groups, the maximum planar sizes of the storage items of the individual groups.
Figure 3F:
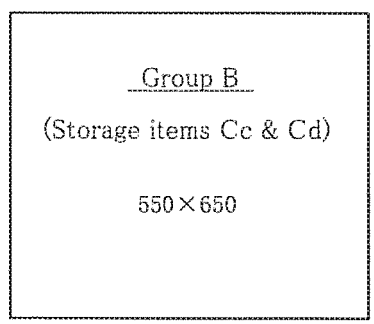

In the storage facility configured as described above, by the lateral movement of the Y-direction laterally moving member 3 in the Y direction and movement of the carriage 5 on the Y-direction laterally moving member 3 in the X direction, the storage item gripping means 6 can be moved to a certain height above a desired position (including a storage transport terminal end portion and a retrieval transport beginning end portion which will be described later) on the storage item placement plane 1. On the other hand, the storage item gripping means 6 can be switched between a gripping action releasing state and a gripping action state. In the gripping action releasing state of the storage item gripping means 6, the gripping units 7A and 7B are in an X-direction retract limit position in which the gripping units 7A and 7B are separated from each other in the X direction, and the gripping columnar members 8a to 9b are in a Y-direction retract limit position in which the gripping columnar members 8a to 9b are separated from each other with respect to the lifting tools 10 and 11 in the Y direction. In the gripping action state of the storage item gripping means 6, the gripping units 7A and 7B are moved up to a distance corresponding to the X-direction length L of the storage item C so as to approach each other in the X direction, and simultaneously, the respective gripping columnar members 8a to 9b are moved up to a distance corresponding to the Y-direction width W of the storage item C so as to approach each other with respect to the lifting tools 10 and 11 in the Y direction, and as shown in FIG. 2B, the four gripping columnar members 8a to 9b are fitted from the outside to the four corners of the storage item C so as to position the storage item C, and simultaneously, the respective engagement tools 10a and 11a of the pair of the lifting tools 10 and 11 are engaged with the reinforcement overhanging rib Cx on the outside surface of the storage item C parallel to the Y direction. In a state where the engagement tools 10a and 11a are engaged with the reinforcement overhanging rib Cx in the storage item C, at least two pins at the same height in the protruding posture in the respective engagement tools 10a and 11a enter the lower side of the reinforcement overhanging rib Cx in the storage item C, and pins which collide against the reinforcement overhanging rib Cx are brought into a state where they are retracted against a biasing force.

When the storage item C is transported by the storage item gripping means 6 between desired two positions (including the storage transport terminal end portion and the retrieval transport beginning end portion which will be described later) on the storage item placement plane 1, the storage item gripping means 6 is moved to a position directly above the storage item C to be retrieved by the lateral movement of the Y-direction laterally moving member 3 in the Y direction and the movement of the carriage 5 on the Y-direction laterally moving member 3 in the X direction. Then, the gripping units 7A and 7B of the storage item gripping means 6 in the gripping action releasing state are lowered to the height of the storage item C to be retrieved with respect to the carriage 5, and thereafter the storage item gripping means 6 is switched to the gripping action state. Consequently, as shown in FIG. 2B, the four gripping columnar members 8a to 9b are fitted from the outside to the four corners of the storage item C so as to position the storage item C, and simultaneously, the respective engagement tools 10a and 11a of the pair of the lifting tools 10 and 11 are engaged with the reinforcement overhanging rib Cx in the storage item C, then the storage item gripping means 6 in the gripping action state is raised to a raising limit height with respect to the carriage 5 or to such a height that the horizontal transport of the storage item C is not obstructed.

The storage item C to be retrieved is lifted to a predetermined height as described above, then the storage item C gripped by the storage item gripping means 6 is horizontally transported to a target lowering position by the lateral movement of the Y-direction laterally moving member 3 in the Y direction and the movement of the carriage 5 on the Y-direction laterally moving member 3 in the X direction. The lateral movement of the Y-direction laterally moving member 3 and the movement of the carriage 5 may be performed simultaneously with the process for lifting the storage item C to be retrieved to the predetermined height. Thereafter, the storage item gripping means 6 gripping the storage item C is lowered to a predetermined height with respect to the carriage 5, then the storage item gripping means 6 in the gripping action state is switched to the gripping action releasing state and thus the storage item C is released from the storage item gripping means 6, with the result that it is possible to lower the storage item C to the target position. Thereafter, the storage item gripping means 6 in the gripping action releasing state is raised to a predetermined height with respect to the carriage 5, and thus a series of storage item lifting transport steps are completed.

It is noted that, when the storage items C can be stacked, a plurality of storage items C in a stacked state can be collectively lifted and transported by the gripping action of the storage item gripping means 6 on the lowermost storage item C. Although at this time, only the lowermost storage item C is lifted by the lifting tools 10 and 11 of the storage item gripping means 6, since the four corners of all of the storage items C in a stacked state including the lowermost storage item C are positioned by the four gripping columnar members 8a to 9b, the stacked state is stably held. It is a matter of course that, in order to handle a large number of stacked storage items, in the lifting tools 10 and 11, the engagement tools 10a and 11a can also be provided vertically in a plurality of stages on the raising/lowering columnar members 10b and 11b. By the operation of the storage item gripping means 6, it is also possible to transport out only a specific storage item C among a plurality of storage items C in a stacked state and to newly stack another storage item C on the storage item C stored on the storage item placement plane 1.

Figure 4:
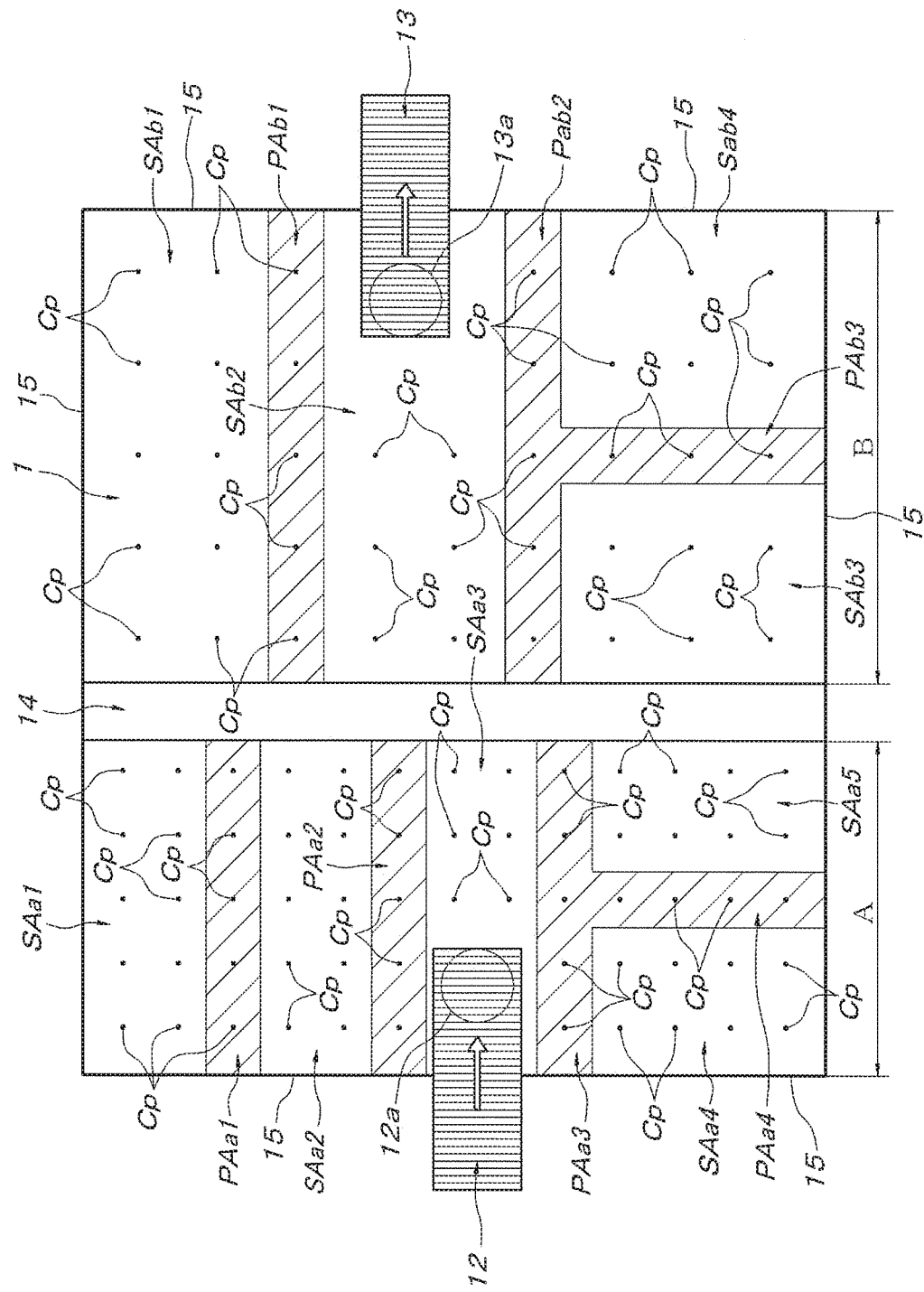
FIG. 4 is a plan view illustrating a setting example of an embodiment according to the present invention in the storage facility.

When it is assumed that as the storage items C which are handled in the storage facility described above, for example, as shown in FIGS. 3A to 3D, four storage items Ca to Cd having different planar sizes are present, they are classified into groups according to the planar sizes such that the storage items Ca and Cb whose planar sizes fall within a range of 350 mm×420 mm are classified into a group A and that the storage items Cc and Cd whose planar sizes exceed the range of 350 mm×420 mm and fall within a range of 550 mm×650 mm are classified into a group B. On the other hand, although not shown in FIG. 1, as shown in FIG. 4, the storage item placement plane 1 is generally rectangular, and a storage conveyor 12 and a retrieval conveyor 13 are also provided. The storage conveyor 12 and the retrieval conveyor 13 are provided such that a storage transport terminal end portion 12a and a retrieval transport beginning end portion 13a enter from the sides of the storage item placement plane 1 into the inside thereof. Although the storage conveyor 12 and the retrieval conveyor 13 can be provided in desired places around the storage item placement plane 1, in the figure, they are separately provided at the two sides of the storage item placement plane 1 parallel to each other. Although in the storage item placement plane 1, there is a case where an unusable region 14 which cannot be used as a placement surface of the storage items such as a passage region that crosses the storage item placement plane 1 is present, when such unusable region 14 and the like is present, the region other than the unusable region 14 is classified into a storage region A for storing group A storage items Cab and a storage region B for storing group B storage items Ccd. An area ratio between the storage regions A and B is arbitrarily set according to the handling volume of group A storage items Cab and group B storage items. In the example of the figure, the storage regions A and B are divided by a boundary which is a passage serving as the unusable region 14.

Although in the storage region A, storage item placement surfaces whose planar size is 350 mm×420 mm are aligned in a grid pattern in a fixed orientation, and in the storage region B, storage item placement surfaces whose planar size is 550 mm×650 mm are aligned in a grid pattern in a fixed orientation, between the respective storage item placement surfaces, a play region is secured which has such a width that the gripping columnar members 8a to 9b of the storage item gripping means 6 and the lifting tools 10 and 11 can perform the gripping action and the gripping releasing action on the storage item on the storage item placement surface without being obstructed. In all of the storage item placement surfaces within the storage regions A and B, storage item placement points Cp are set in the centers thereof. On the control program of the storage/retrieval device 2, absolute addresses (for example, X-Y coordinate values) are set for all of the storage item placement points Cp on the storage item placement plane 1 including the storage item placement points in the storage transport terminal end portion 12a and the retrieval transport beginning end portion 13a. On the other hand, a storage/retrieval reference point on the storage/retrieval device 2 is the center point of the storage item C in plan view which is gripped by the storage item gripping means 6, in other words, the center point of a rectangular plane surrounded by the four gripping columnar members 8a to 9b, and the gripping action and the gripping releasing action on the storage item C at the time of the storage/retrieval operation are performed in a state where the storage/retrieval reference point on the storage/retrieval device 2 matches the storage item placement point Cp on the storage item placement plane 1 in plain view.

The periphery of the storage item placement plane 1 is surrounded by an attachable/detachable fence 15, and the storage regions A and B within the storage item placement plane 1 are divided into small areas SAa1 to SAa5 and SAb1 to SAb4 each of which includes a plurality of storage item placement points Cp. Each of the small areas SAa1 to SAb4 is formed in the shape of a rectangle which is surrounded by the fence 15 around the storage item placement plane 1, the passage serving as the unusable region 14, and the passage regions PAa1 to PAa4 and PAb1 to PAb3. Each of the passage regions PAa1 to PAb3 is established linear so as to occupy a plurality of storage item placement surfaces (storage item placement points Cp) connected in series in a longitudinal direction or a lateral direction, and passage regions PAa1 to PAb3 connect, for example, between the fence 15 around the storage item placement plane 1 and the passage serving as the unusable region 14, and between the intermediate positions of the other passage regions PAa3 and PAb2 in the length direction and the fence 15 around the storage item placement plane 1, and it is possible to freely enter and exit the passage regions through the passage serving as the unusable region 14 or from the outside of the periphery of the storage item placement plane 1 in a state where the fence 15 is detached.

It is noted that, although not shown in FIG. 4, when the storage item placement plane 1 is even wider in area, the passage regions can also be established such that among the passage regions PAa1 to PAb3, two passage regions juxtaposed to each other are connected. It is also possible to establish a passage region whose one end is closed by the small areas SAa1 to SAb4. Furthermore, although in FIG. 4, each of the small areas SAa1 to SAb4 is made to have a width such that two storage item placement surfaces are exactly accommodated, for example, in a case where the planar size of the storage item is small, it is also possible to extend the width such that three or more storage item placement surfaces are exactly accommodated. Likewise, although each of the passage regions PAa1 to PAb3 shown in FIG. 4 is made to have a width such that one storage item placement surface is exactly accommodated, for example, in a case where the planar size of the storage item is small, it is also possible to extend the width such that two or more storage item placement surfaces are exactly accommodated.

A control device for automatically operating the storage/retrieval device 2 is programmed so as to select, as the storage item placement points Cp in the storage destination of the storage items Cab and Ccd to be stored, only the storage item placement points Cp in the small areas SAa1 to SAb4, excluding the storage item placement points Cp within the passage regions PA. That is, when the group A storage item Cab which should be stored in the storage region A is sent into the storage transport terminal end portion 12a of the storage conveyor 12, the small areas SAa1 to SAb5 within the storage region A are searched for the storage item placement point Cp in an empty state, and the storage/retrieval device 2 is automatically operated as described above such that on the storage item placement point Cp which was searched for, the group A storage item Cab on the storage transport terminal end portion 12a is stored. Also, when the group B storage item Ccd which should be stored in the storage region B is sent into the storage transport terminal end portion 12a, the small areas SAb1 to SAb4 within the storage region B are searched for the storage item placement point Cp in an empty state, and the storage/retrieval device 2 is automatically operated as described above such that on the storage item placement point Cp which was searched for, the group B storage item Ccd on the storage transport terminal end portion 12a is stored.

It is noted that, in a case where the storage item placement points Cp in an empty state in the storage destination of the storage items Cab and Ccd to be stored are searched for, the following setting methods can be considered:

1) Regardless of the small areas SAa1 to SAa5 within the storage region A or the small areas SAb1 to SAb4 within the storage region B, the storage item placement point Cp in an empty state is selected which is closest to or farthest from a storage reference point that was simply set, for example, a storage reference point that was set within a center portion region of the storage item placement plane 1.

2) A storage reference point is set to one corner of all of the small areas SAa1 to SAb4 in advance, and priorities at the time of storage are set for the small areas SAa1 to SAa5 within the storage region A and the small areas SAb1 to SAb4 within the storage region B in advance, and among the storage item placement points Cp in an empty state within the highest-priority small area at the time of storage, the storage item placement point Cp in an empty state is selected which is closest to or farthest from a storage reference point.

2a) The above-described priorities at the time of storage for the small areas SAb1 to SAb4 are set such that, when the storage item placement points Cp in an empty state are no longer present within a higher-priority small area, a search for the storage item placement points Cp in an empty state on a lower-priority small area is performed, and that the individual small areas are in a full state in the order of the priorities.

2b) The above-described priorities at the time of storage for the small areas SAb1 to SAb4 are set such that the storage items are stored in the individual small areas one unit by one unit (one storage item or stacked storage items) in the order of the priorities.

On the other hand, since the retrieval operation, that is, the retrieval operation in which the storage item to be retrieved is lifted by the storage/retrieval device 2 onto the retrieval transport beginning end portion 13a of the retrieval conveyor 13 and is transported, is performed at any time separately from the storage operation, when the storage operation is started, the storage item placement point Cp in an empty state can be normally present also within a region where the storage item is preferentially and previously stored. In such a situation, the storage item placement points Cp in the storage destination including the storage item placement points Cp in an empty state site upon retrieval are searched for, and thus the storage items Cab and Ccd are stored in the storage item placement points Cp site upon retrieval and search.

Although in the storage facility in the embodiment described above, usually, the storage/retrieval operation on the storage item is automatically performed by the automatic operation of the storage/retrieval device 2, in a case where it becomes necessary to perform an urgent retrieval operation when the storage/retrieval device 2 cannot be used due to a failure, or regular maintenance and inspection or the like, an operator enters the storage item placement plane 1 so as to manually take out the storage item Cab or Ccd to be urgently retrieved. In a case where the manual urgent retrieval operation is performed, the place where the storage item Cab or Ccd to be urgently retrieved is stored can be found by searching a storage status recording database. That is, since it is possible to find in which of the small areas SAa1 to SAb4 in the storage region A or B the storage item Cab or Ccd to be urgently retrieved is present on the storage item placement point Cp, the operator can enter one of the passage regions PAa1 to PAb3 adjacent to the target small area or the passage serving as the unusable region 14, and from one of the passage regions PAa1 to PAb3 or the passage serving as the unusable region 14, take out the storage item Cab or Ccd placed on the storage item placement point Cp within the target small area, utilize the one of the passage regions PAa1 to PAb3 or the passage serving as the unusable region 14 and thereby bring the item to the outside of the storage item placement plane 1.

It is noted that, when entering/exiting the one of the passage regions PAa1 to PAb3 or the passage serving as the unusable region 14, part of the fence 15 is detached. In a case where the storage item Cab or Ccd to be urgently retrieved is adjacent to the inner side of the fence 15, part of the fence 15 which is adjacent to the storage item Cab or Ccd is detached, and thus it is also possible to take out the storage item Cab or Ccd to be urgently retrieved directly from the outside of the periphery of the storage item placement plane 1. It is a matter of course that, when the entrance/exit port for the one of the passage regions PAa1 to PAb3 or the passage serving as the unusable region 14 which is selected is closed by the fence 15, part of the fence 15 is detached.

Figure 5:
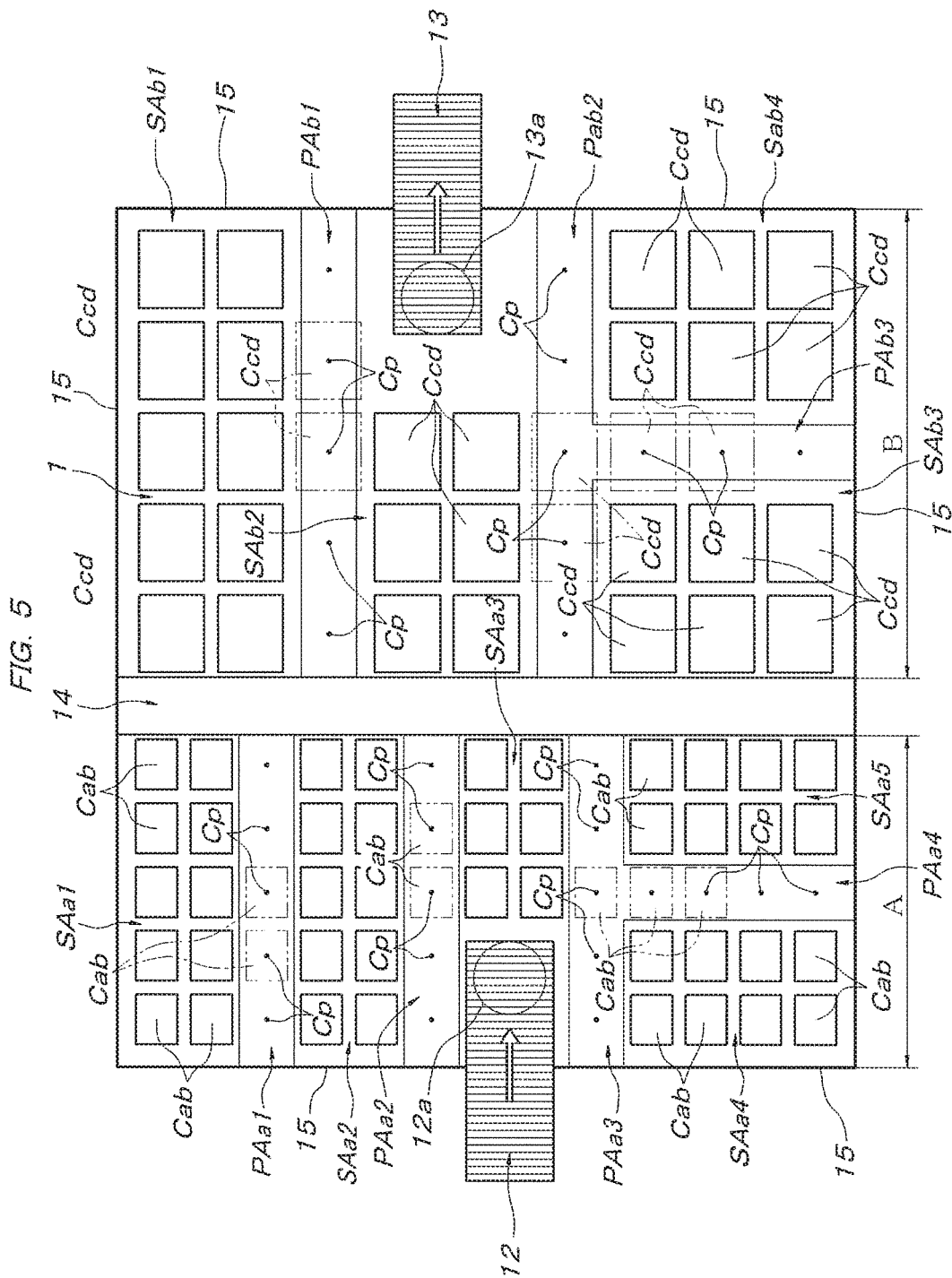
FIG. 5 is a plan view illustrating a state of usage of the embodiment.

In a situation where the storage/retrieval operation on the storage items are automatically performed by the automatic operation of the storage/retrieval device 2, when the total number of storage items retrieved per unit time is larger than the total number of storage items stored, eventually, as shown in FIG. 5, all of the small areas SAa1 to SAa5 within the storage region A or all of the small areas SAb1 to SAb4 within the storage region B may become full of the storage items Cab or Ccd. In such a case, as indicated by imaginary lines in FIG. 5, the storage items Cab are stored on the storage item placement points Cp within the passage regions PAa1 to PAa4 of the storage region A, and the storage items Ccd are stored on the storage item placement points Cp within the passage regions PAb1 to PAb3 of the storage region B, and thus it is possible to effectively utilize the empty space. In this case, it is preferable to store the storage items close together not from the passage serving as the unusable region 14 or the side of the entrance/exit port which opens to the side of the fence 15 in each of the passage regions PAa1 to PAb3, but from an inner end section farthest from the entrance/exit port in each of the passage regions PAa1 to PAb3.

It is noted that the storage method of establishing the storage regions corresponding to the planar sizes of the storage items and dividing the storage regions, which are the storage destinations, according to the planar sizes of the storage items to be stored described in the embodiment can be adopted as necessary and is not particularly essential for the present invention. Furthermore, the positions of the storage conveyor and the retrieval conveyor provided together on the storage item placement plane are freely set according to the situation, and depending on the case, one conveyor which serves as both storage conveyor and retrieval conveyor can be utilized. It is a matter of course that, the presence of the unusable region 14 such as the passage is also not essential for the present invention. Although the storage facility is illustrated in which the attachable/detachable fence 15 is detached such that it is possible to enter the storage item placement plane 1 from a desired place therearound, in a case where, around the storage item placement plane 1, a fixed surrounding wall such as the wall of a building is provided instead of the fence 15, the passage region may be established along the inner side of the fixed surrounding wall, and depending on the case, it is possible to narrow the width of the small area such that all of the storage items in the small area can be manually taken out only from the passage region on the inner side.

The planar storage facility of the present invention can be utilized as a storage facility for box-shaped transport containers which can be placed and stored on a plane, in particular, for storage items which are relatively small and light enough to be transported manually.

What is claimed is:
1. A planar storage facility comprising:
   a storage item placement plane;
   a storage conveyor;
   a retrieval conveyor; and
   a storage/retrieval device which lifts and transports a storage item between a desired position on the storage item placement plane and the storage conveyor and the retrieval conveyor,
   wherein a plurality of passage regions dividing the storage item placement plane into small areas are established in the storage item placement plane, and at least one end of the passage regions opens to an outside of a periphery of the storage item placement plane and each passage region is configured such that an operation of manually transporting out a storage item stored in one of the small areas can be performed from within an associated passage region by transporting the storage item in a horizontal direction, via the associated passage region, to the outside of the periphery of the storage item placement plane.
2. The planar storage facility according to claim 1, wherein each of the small areas is set to have an area such that the operation of manually transporting out the storage item in the small area can be performed from the passage region or the outside of the periphery of the storage item placement plane without an operator entering the small area.
3. The planar storage facility according to claim 1, wherein in a full state where the storage items are stored in all of the respective small areas, the storage/retrieval device is controlled such that the storage item can be stored into the passage region from an innermost section of the passage region farthest from an open end which opens to the outside of the periphery of the storage item placement plane.
4. The planar storage facility according to claim 1, wherein the storage item placement plane is divided into a plurality of storage regions according to planar sizes of the storage items, the small areas are established within each of the storage regions by the passage regions, and the storage item to be stored is stored into the small area selected within the storage region compatible with the planar size of the storage item.

* * * * *